(12) United States Patent
Hatanaka

(10) Patent No.: US 7,420,773 B2
(45) Date of Patent: Sep. 2, 2008

(54) DISK DEVICE INCLUDING AN AIR PRESSURE COMPENSATION BAG

(75) Inventor: Tatsuya Hatanaka, Sagamihara (JP)

(73) Assignee: Kabushiki Kaisha Toshiba, Tokyo (JP)

(*) Notice: Subject to any disclaimer, the term of this patent is extended or adjusted under 35 U.S.C. 154(b) by 758 days.

(21) Appl. No.: 11/010,313

(22) Filed: Dec. 14, 2004

(65) Prior Publication Data
US 2005/0157420 A1 Jul. 21, 2005

(30) Foreign Application Priority Data
Jan. 19, 2004 (JP) ............... 2004-010807

(51) Int. Cl.
G11B 33/14 (2006.01)
(52) U.S. Cl. .................. 360/97.02
(58) Field of Classification Search ....... 360/97.01, 360/97.02, 97.03, 97.04, 98.01
See application file for complete search history.

(56) References Cited

U.S. PATENT DOCUMENTS

| 6,077,335 | A | * | 6/2000 | Schneider et al. ............. 96/135 |
| 6,128,159 | A | * | 10/2000 | Ino ........................ 360/97.02 |
| 6,317,286 | B1 | * | 11/2001 | Murphy et al. ........... 360/97.02 |
| 6,426,932 | B2 | * | 7/2002 | Omori et al. ................. 720/648 |
| 6,926,761 | B2 | * | 8/2005 | Johnson et al. ............... 96/135 |

FOREIGN PATENT DOCUMENTS

| JP | 54-000614 A | * | 1/1979 |
| JP | 58-56270 | | 4/1983 |
| JP | 3-266825 | | 11/1991 |
| JP | 4-43353 | | 2/1992 |
| JP | 5-74129 | | 3/1993 |
| JP | 7-287976 | | 10/1995 |
| JP | 09-170636 | | 6/1997 |
| JP | 2001-143462 | | 5/2001 |
| JP | 2004-63029 | | 2/2004 |

OTHER PUBLICATIONS

Danish Search Report dated Sep. 27, 2005 for Singapore Appln. No. 200407900-0.
Chinese Office Action dated Feb. 9, 2007.

* cited by examiner

Primary Examiner—Jefferson Evans
(74) Attorney, Agent, or Firm—Pillsbury Winthrop Shaw Pittman, LLP

(57) ABSTRACT

A HDD includes a disk unit, a circuit board and an air intake and exhaust mechanism. In the disk unit, a magnetic disk is rotatably provided. The circuit board is provided with a driving circuit including electronic components. The air intake and exhaust mechanism includes a bag provided between the disk unit and the circuit board. The bag includes a communication hole airtightly communicating with an air intake and exhaust hole provided in a housing of the disk unit, and air intake and exhaust valves are provided at the bag, and located apart from the communication hole. Due to this structure, when the internal air pressure of the disk unit changes, gas flows into and out from the gap between the disk unit and the bag through the communication hole, thus restricting changing of the air pressure.

20 Claims, 3 Drawing Sheets

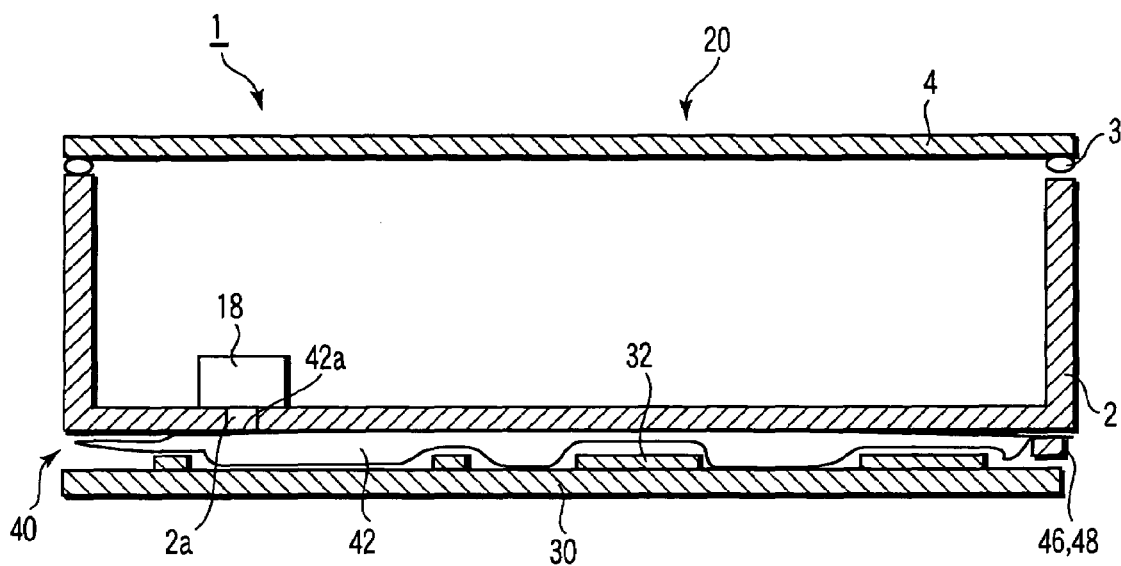
F I G. 2
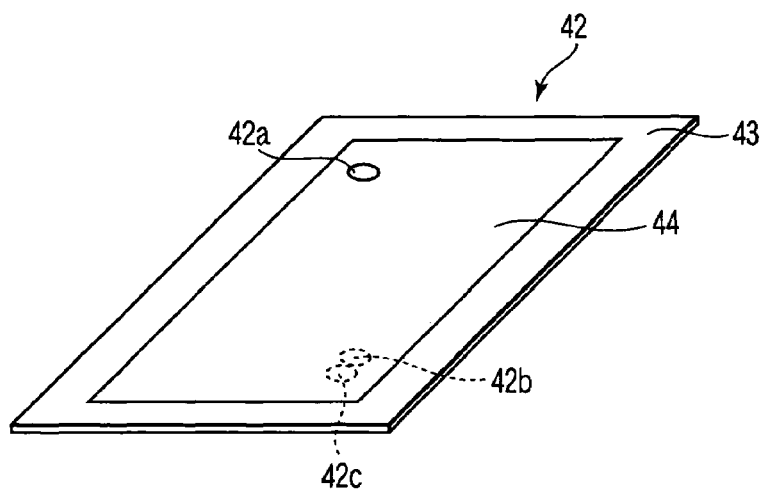
F I G. 3

US 7,420,773 B2

DISK DEVICE INCLUDING AN AIR PRESSURE COMPENSATION BAG

CROSS-REFERENCE TO RELATED APPLICATIONS

This application is based upon and claims the benefit of priority from prior Japanese Patent Application No. 2004-010807, filed Jan. 19, 2004, the entire contents of which are incorporated herein by reference.

BACKGROUND OF THE INVENTION

1. Field of the Invention

This invention relates to a disk device provided with an air intake and exhaust mechanism for restricting changing of the internal air pressure of a housing.

2. Description of the Related Art

As a conventional disk device including an air intake and exhaust mechanism, for example, the following device is well known: a bellows-shaped expandable container is attached to an outer surface of a filter which is provided at the housing of the device (as disclosed in, e.g., Jpn. Pat. Appln. KOKAI Publication No. 3-266285). The container expands/contracts in accordance with variation of the internal air pressure of the housing, and thus prevents the outside air from entering the housing when the internal air pressure of the housing varies.

However, in the above device, it is necessary to provide space for attaching the bellows-shaped expandable container to the outer surface of the housing. This is contrary to a requirement of providing a smaller device. In particular, it should be noted that in the case where water absorptive resin or the like is provided in the container as shown in FIG. 1 of Jpn. Pat. Appln. KOKAI Publication No. 3-266285, it is necessary to provide a relatively large space for expansion/contraction of the container.

Furthermore, when variation of the air pressure in the housing exceeds the tolerable limit of the bellows-shaped expandable container, the container is broken. In order to avoid this, if the size of the container is increased to ensure a sufficient volume, a larger space is required to accommodate the container.

BRIEF SUMMARY OF THE INVENTION

The object of the present invention is to provide a disk device including an air intake and exhaust mechanism which can be accommodated in a small space, and at the same time fulfill its intended function.

In order to attain the above object, a disk device according to an aspect of the present invention comprises: a disk unit in which a disk-shaped medium is rotatably provided in a flat housing of the disk unit; a circuit board on which a driving circuit is mounted, and which is bonded to the disk unit; and a flat bag which is provided between the disk unit and the circuit board, include a communication hole airtightly communicating with the housing, and has a volume which is changeable to compensate for changing of the internal air pressure of the housing.

Also, in order to attain the object, a disk device according to another aspect of the present invention comprises: a disk unit in which a disk-shaped medium is rotatably provided in a flat housing of the disk unit; a flat bag (42) including a communication hole (42a) airtightly communicating with the housing of the disk unit, the flat bag having a volume which is changeable to compensate for changing of an internal air pressure of the housing; and air intake and exhaust valves (46, 48) configured to take outside air in the bag, and exhaust air therefrom.

Furthermore, in order to attain the object, a disk device according to a further aspect of the present invention comprises: a disk unit in which a disk-shaped medium is rotatably provided in a flat housing of the disk unit; a circuit board on which a driving circuit is mounted, and which is bonded to the disk unit; and a flat bag provided between the disk unit and the circuit board, and configured to restrict transmission of heat, and absorb vibration and a sound,
wherein the bag includes a communication hole airtightly communicating with the housing of the disk unit, and has a volume which is changeable to compensate for changing of the internal air pressure of the housing.

In the disk device of the present invention, since the bag, as described above, is formed to be flat and to airtightly communicate with the disk unit, an air intake and exhaust mechanism having sufficiently great volume is provided in a small space.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a schematic view for use in explaining the position of an air intake and exhaust mechanism of the HDD in FIG. 1.

FIG. 3 is a schematic perspective view of a flat bag of the air intake and exhaust mechanism in FIG. 2.

DETAILED DESCRIPTION OF THE INVENTION

An embodiment of the present invention will be explained with reference to the accompanying drawings.

Figure 1:
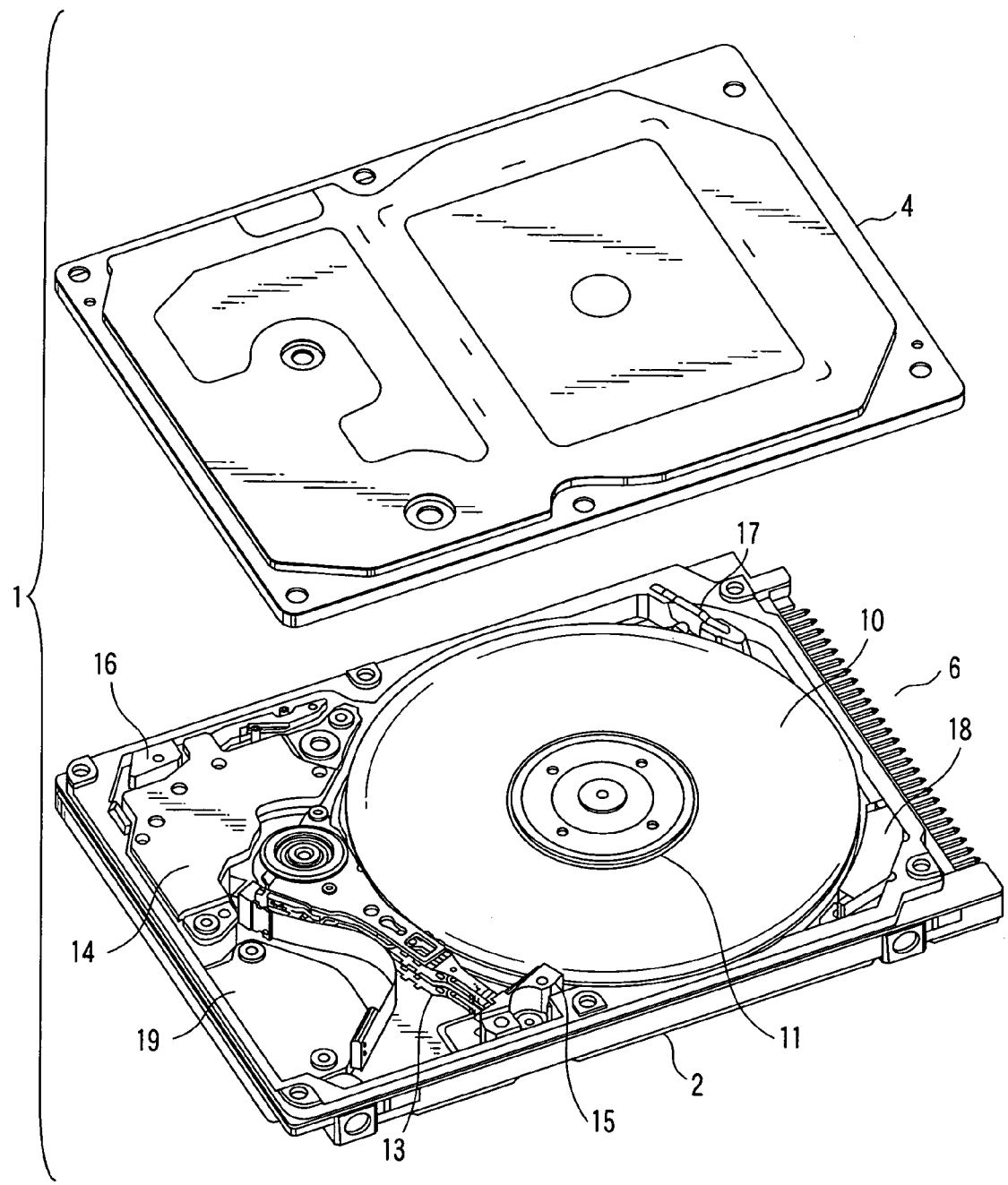
FIG. 1 is a perspective exploded view of an HDD according to an embodiment of the present invention.

FIG. 1 is a schematic perspective view of a hard disk drive (HDD) 1 (disk device) according to the embodiment of the present invention.

The HDD 1 includes a housing 2 and a top cover 4. The housing 2 is substantially rectangular, and includes an upper surface which is open. The top cover is placed on the upper surface of the housing 2, with gasket 3 interposed therebetween (as shown in FIG. 2), and is then fixed to the housing 2 by a number of screws not shown. In such a manner, the housing 2 and the top cover 4 are combined to function as the housing of the HDD 1.

In the housing 2, there are provided two magnetic disks (disk-shaped mediums) 10, a spindle motor 11, a number of suspension arms 13, a voice coil motor 14, a ramped loading mechanism 15, an inertia latch mechanism 16, a circulation filter 17, an adsorption filter 18, and a flexible printed circuit board (FPC) 19 on which a head IC is mounted, etc. The spindle motor 11 supports the magnetic disks 10, and is also intended to rotate the magnetic disks 10. At the distal ends of the suspension arms, magnetic heads are provided which record/reproduce information in/from the magnetic disks 10. The voice coil motor 14 vibrates the suspension arms 13 to move the magnetic heads in a substantially radius direction of each of the magnetic disks 10. The ramped loading mechanism 15 holds the magnetic heads in a retreating position where the heads are separated from the magnetic disks 10. The inertia latch mechanism 16 prevents the magnetic heads from being moved from the retreating position due to vibration. The circulation filter 17 traps dust in the housing 2. The adsorption filter 18 catches dust contained in air taken in the housing 2 by an air intake and exhaust mechanism 40 which will be described later.

FIG. 2 is a schematic view showing a positional relationship between a disk unit 20 in which the magnetic disks 10 are rotatably provided in a flat space defined by the housing 2 and the top cover 4, a circuit board 30 on which a driving circuit including electronic components 32 is mounted, and an air intake and exhaust mechanism 40 in the embodiment of the present invention. In order that the positional relationship be clearly understood, FIG. 2 omits illustrations of structural elements provided in the housing of the disk unit 20.

As shown in FIG. 2, the circuit board 30 is attached to a bottom side of the housing 2 of the disk unit 20. At this time, the circuit board 30 is attached such that a surface thereof on which the electronic components 32 are mounted faces the bottom of the housing 2.

At one end of the housing 2, a connector 6 is projected from the circuit board 30 (see FIG. 1). The connector 6 includes a number of pins to be electrically connected to an external device (not shown). Also, on the bottom side of the housing 2, a connector (not shown) including pins projected from the FPC 19 is exposed.

The HDD 1 is operated to record/reproduce information in/from the magnetic disks 10. When information is record/reproduced in/from the magnetic disks 10, the magnetic disks 10 are rotated by the spindle motor 11, and the suspension arms 13 are vibrated by the voice coil motor 14 to move the magnetic heads to positions above desired tracks (not shown) of the magnetic disks 10.

The air intake and exhaust mechanism 40 includes a flat bag 42, which is provided between the housing 2 of the disk unit 20 and the circuit board 30. The bag 42 is formed of soft material which is deformable in accordance with irregular formations of the electronic components 32 mounted on the circuit board 30. In this embodiment, the bag 42 is formed of two polypropylene sheets each having a thickness of approximately 100 μm. The bag 42 functions as a heat insulator which restricts transmission of heat between the disk unit 20 and the circuit board 30, a shock absorber for absorbing vibration, and a soundproofing member for absorbing a sound.

On the bottom of the housing 2, an air intake and exhaust hole 2a is formed to extend through a bottom plate of the housing 2, and communicates with the bag 42 after the bag 42 is attached to the housing 2 as described later. Furthermore, the above adsorption filter 18 is provided on part of the inner surface of the bottom plate, in which the air intake and exhaust hole 2a is formed. The thickness of each of the sheets of which the bag 42 is formed can be changed arbitrarily. Also, the material of the sheets can be selected in terms of quality. For example, the bag 42 may be formed of polyethylene or PET sheets or polyimide film or metal lamination film which can reliably prevents moisture from entering the housing 2.

More specifically, according to the embodiment, two rectangular polypropylene sheets having the same size are stacked together, and frame-shaped peripheral portions of the sheets, which will be referred to as a seal portion 43, is welded together by heat, thereby forming the bag 42, as shown in FIG. 3. The shapes of the seal portion 43 can be designed arbitrarily. Furthermore, a gas chamber 44 is formed to be surrounded by the seal portion 43. In the gas chamber 44, a chemical adsorption material such as activated carbon containing a Teflon fiber binder or an adsorbent such as a humidity adjusting agent is arbitrarily sealed. Alternatively, before sealing the gas chamber 44, powder (solid particles) for preventing the sheets from adhering to each other may be put into the gas chamber 44. Also, as another effective method of preventing adhesion of the sheets, there is a method in which the internal surfaces of sheets may be irregularly shaped by embossing processing. This method may be also applied.

In a corner portion of the gas chamber 44, a communication hole 42a is formed to enable the gas chamber 44 to airtightly communicate with the air intake and exhaust hole 2a of the disk unit 2. The communication hole 42a is formed in advance in a position where it is coincident with the air intake and exhaust hole 2a when the bag 42 is bonded to the disk unit 20. Then, the bag 42 is joined to the bottom of the disk unit 20 such that at least part of an upper surface of the bag 42, which surrounds the communication hole 42a, and will be referred to as surrounding part, is airtightly bonded to a bottom portion of the housing 2. Furthermore, in order to prevent the sheets from adhering to each other, i.e., in order to ensure space between the sheets, it is preferable that at least part of a lower surface of the bag 42, which is located opposite to the communication hole 42a, be bonded to the circuit board 30. By virtue of this structural feature, the bag 42 is prevented from closing the air intake and exhaust hole 2a when gas flows from the bag 42 into the disk unit 20.

Figure 4:
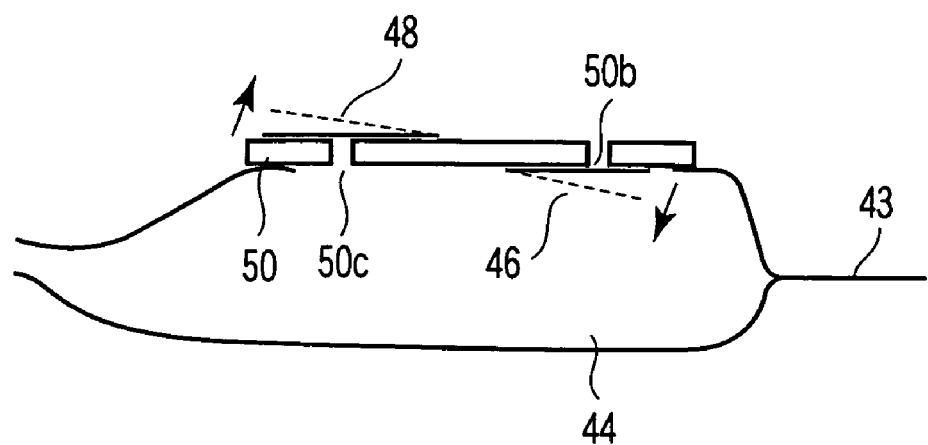
FIG. 4 is a schematic view showing air intake and exhaust valves provided at the bag in FIG. 3.

Two holes 42b and 42c are formed in the gas chamber 44 in such a way as to be diametrically opposed to the communication hole 42a. In the two holes 42b and 42c, an air intake valve 46 for taking the outside air in the bag 42 and an air exhaust valve 48 for exhausting air from the bag 42 are provided. The intake valve 46 and the exhaust valve 48 are provided to prevent the bag 42 from being broken due to an excessively great pressure. To be more specific, as shown in FIG. 4, holes 50b and 50c are formed in a plate-like base member 50 in association with the holes 42b and 42c of the bag 42, and the intake valve 46 and the exhaust valve 48 are respectively provided at the holes 50b and 50c such that they are each operated under a given pressure. In the embodiment, the pressure for operating each of the intake valve 46 and the exhaust valve 48 is set at 0.5 atmospheres based on the pressure-resistant function of the polypropylene sheets. That is, the intake valve 46 and the exhaust valve 48 are operated to reduce the difference between the air pressure of the outside air and the air pressure of the gas chamber 44 of the bag 42, when the difference exceeds 0.5 atmospheres.

In other words, neither the intake valve 46 nor the exhaust valve 48 operates when the HDD 1 is in a normal operation state; they operate only when a great pressure which would damage the bag 42 is applied. Thus, the disk unit 20 communicates with the bag 42 at all times, whereas it is rare that air in the disk unit 20 and the outside air mix with each other. However, in order that the outside air containing a gas component, which adversely effects the HDD1, be prevented as much as possible from flowing into the disk unit 20, the communication hole 42a is located as far as possible from the holes 42b and 42c for taking in and exhausting air.

Figure 5:
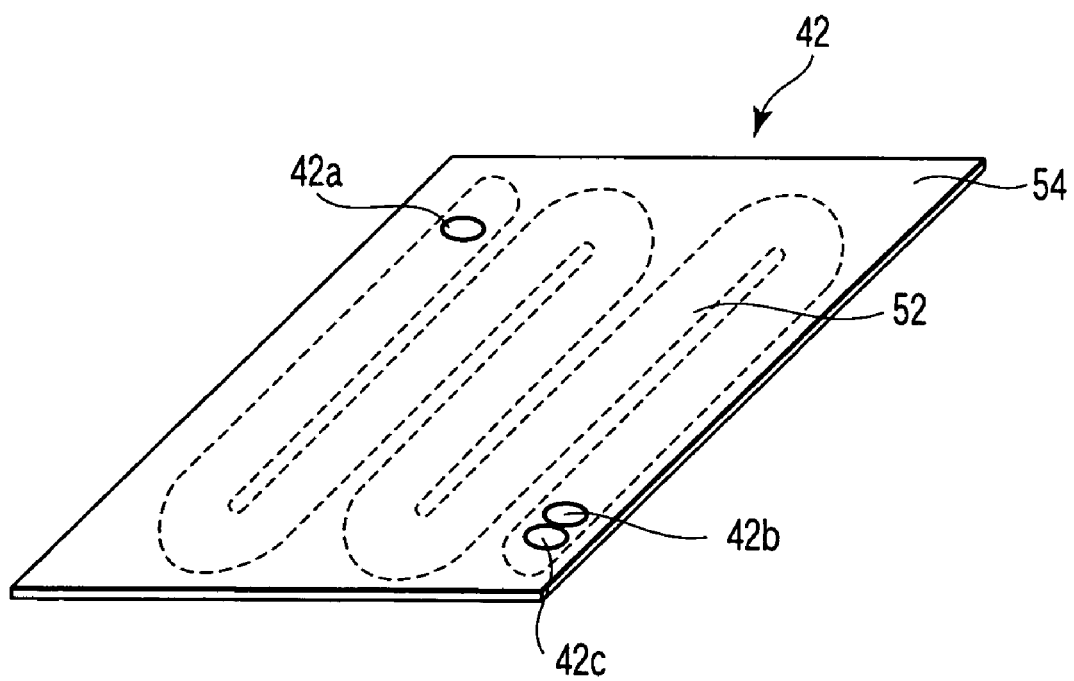
FIG. 5 is a schematic perspective view of a modification in which a gas flow passage of the bag is elongated.

In the above structure provided with the intake valve 46 and the exhaust valve 48, in order to more effectively restrict flowing of the outside air into the structure as much as possible, it can be considered that, for example, an elongated gas flow passage 52 be formed as an elongated gas chamber to extend from the communication hole 42a to the holes 42b and 42c, as shown in FIG. 5. In this case, as shown in FIG. 5, portions of the two sheets are welded together to form a seal portion 54, and the elongated gas chamber, i.e., the gas flow passage 52, is folded a number of times. By virtue of this structural feature, before the outside air flowing into the elongated gas flow passage 52 through the hole 42b reaches the communication hole 42a, a-gas component which adversely effects the HDD1 adheres to a wall of the gas flow passage 52, as a result of which there is a low risk that the above gas component may flow into the disk unit 20.

When the internal air pressure of the disk unit 20 of the HDD 1 including the above intake and exhaust mechanism 40 varies due to a temperature change or the like, the bag 42 expands/contracts to make airs in the disk unit 20 flow into the gas chamber 44 through the communication hole 42a, or to make air in the gas chamber 44 flow into the disk unit 20 through the communication hole 42a. In such a manner, air is released from a closed state to flow from the disk unit 20 into the gas chamber 44, or from the gas chamber 44 into the disk unit 20, thereby restricting changing of the internal air pressure of the housing of the disk unit 20.

As explained above, the flat bag 42 is provided in a slight gap between the disk unit 20 and the circuit board 30, as a result of which it is not necessary to provide specific space for setting the air intake and exhaust mechanism 40, and the device structure of the HDD 1 is made compact. Furthermore, since the air intake and exhaust mechanism 40 of the disk unit 20 is formed in the shape of a bag, it can be manufactured at a low cost. As a result, the HDD 1 can be also manufactured at a low cost.

Furthermore, according to the embodiment, the bag 42 is formed of the above soft sheets, and is thus deformable in accordance with irregular formations of, e.g., the electronic components 32 mounted on the circuit board 30. Also, the position in which the bag 42 can be provided is not limited to the above-mentioned position, that is, the bag 42 can be provided in an arbitrary position. The air intake and exhaust mechanism 40 can be more freely designated. For example, the bag 42 may be provided in such a way as to be in tight contact with the top cover 4. In this case, the bag 42 is deformed in accordance with the formation of the top cover 4 to tightly contact the top cover 4. Alternatively, the bag 42 may be provided in an arbitrary position, after providing the HDD 1 at an electronic device such as a computer. In particular, it should be noted that the bag 42 can be sufficiently provided even in space, since it can be freely deformed.

Moreover, according to the embodiment, various kinds of adsorbents can be sealed in the gas chamber 44 of the bag 42. Thus, when air flows into and out from the housing of the disk unit 20, a gas component contained in the air, which adversely effects the HDD 1, can be efficiently removed. That is, the adsorbents can clean the inside of the housing in cooperation with the adsorption filter 18 provided therein. Particularly, it should be noted that since the air intake and exhaust mechanism 40 is formed in the shape of a bag, a relatively large amount of adsorbents can be sealed in the gas chamber 44, thus greatly contributing to cleaning of the air in the disk unit 20.

In addition, as stated above, each of the intake and exhaust valves 46 and 48 provided at the bag 42 operates at a given pressure. Thus, even when the bag 42 rapidly expands due to a rapid change in the internal air pressure of the disk unit 20, the intake and exhaust valves 46 and 48 can prevent the bag 42 from being broken. Accordingly, the HDD1 according to the embodiment has a high reliability.

The examples of the embodiment of the present invention will be explained as follows:

EXAMPLE 1

In example 1, two polypropylene sheets each having a thickness of 100 μm, a width of 15 mm and a length of 80 mm were prepared. A communication hole 42a was formed close to one of the short sides of one of the sheets, and holes 42b and 42c for provision of an intake valve 46 and an exhaust valve 48 were formed close to the other short side. In this case, it should be noted that the holes 42b and 42c do not need to be separated from each other. That is, they may be formed continuous with each other. In addition, they may be formed in the other of the above sheets.

Then, an annular seal portion was provided in such a manner as to surround the communication hole 42a, and the intake valve 46 and the exhaust valve 48 each having the above structure were provided at the holes 42b and 42c.

Then, the sheets were stacked together, and seal portions 43 each having a width 3 mm were provided at peripheral portions of the sheets. The seal portions 43 of the sheets were heated and welded together, thereby forming a bag 42. In this case, when the bag 42 was formed in the above manner, the sheets were stacked such that the annular seal portion and the intake valve 46 and the exhaust valve 48 are located at outer peripheral surfaces of the bag 42. After being formed, the bag 42 was brought into contact with the disk unit 20 such that the communication hole 42a of the bag 42 was coincident with the air intake and exhaust hole 2a of the disk unit 20. Then, the annular seal portion of the bag 42 was bonded to the disk unit 20.

Ten 2.5-inch drives, i.e., ten HDDs 1 each provided with a magnetic disk having a diameter of 2.5 inches, were made to have a thickness of 9.5 mm in the above manner.

Of the ten HDDs 1, five HDDs 1 were arranged at intervals of approximately 1 cm on a silicone rubber sheet having a thickness of 5 mm, a length of approximately 50 cm and a width of approximately 20 cm, and another silicone rubber sheet identical to the above silicone rubber sheet was provided on the five HDDs 1. Furthermore, another five HDDs 1 were arranged in the same manner as the above five HDDs 1 on the other silicone rubber sheet. Lastly, a further silicone rubber sheet identical to the above silicone rubber sheets were provided on the other five HDDs 1. The ten HDDs 1 set in the above manner are handled as one set. Then, after connectors of the above ten HDDs 1 were connected to a well-known function testing machine, the above one set was applied to a well-known thermostat bath, and an experiment was carried out under the following conditions:

The temperature of the thermostat bath was reduced from normal temperature (25° C.) to −5° C. at a rate of −5° C./min. The temperature was kept at −5° C. for an hour. Thereafter, it was raised from −5° to 65° C. at a rate of 5° C./min. Also, it was kept at 65° C. for an hour. Then, it was lowered to normal temperature (25° C.) at a rate of −5° C./min.

The above cycle of temperature changes was determined as one cycle (e.g., the experiment was performed for 2 hours, 28 minutes, and in this time period, there was no time normal temperature was maintained). In the experiment, the above one set was subjected to 100 cycles. Also, this experiment was carried out, with the heads floated and held in respective positions above outer peripheral positions of data recording areas of the magnetic disks 10 in the HDD 1. Then, the temperature of the above one set was returned to normal temperature each time 10 cycles lapsed, and the entire data recording areas were subjected to a function test regarding reading and writing, etc. Furthermore, as a comparative example, 10 conventional HDDs not having a bag 42 were prepared, and were subjected to the same experiment. The result of the experiment was indicated by the following table 1:

CC-507) made by Kynol Inc. was used as an activated charcoal sheet. Needless to say, the adsorptive sheet is not limited to the cloth absorbent sheet. That is, any sheet may be used as the adsorptive sheet as long as it is flexibly formed such that it can be sealed in a bag 42 of an air intake and exhaust mechanism 40. For example, any of the following sheets can be used: a sheet in which coconut palm grain activated charcoal particles having a particle size of approximately 50 μm are adhered to an adhesive sheet having a desired shape; and

TABLE 1

|  |  | NUMBER OF CYCLES |  |  |  |  |  |  |  |  |  |
| --- | --- | --- | --- | --- | --- | --- | --- | --- | --- | --- | --- |
|  | NUMBER | 10 | 20 | 30 | 40 | 50 | 60 | 70 | 80 | 90 | 100 |
| EXAMPLE 1 | NO. 1 | OK | OK | OK | OK | OK | OK | OK | OK | OK | OK |
|  | NO. 2 | OK | OK | OK | OK | OK | OK | OK | OK | OK | OK |
|  | NO. 3 | OK | OK | OK | OK | OK | OK | OK | OK | OK | OK |
|  | NO. 4 | OK | OK | OK | OK | OK | OK | OK | OK | OK | OK |
|  | NO. 5 | OK | OK | OK | OK | OK | OK | OK | OK | OK | OK |
|  | NO. 6 | OK | OK | OK | OK | OK | OK | OK | OK | OK | OK |
|  | NO. 7 | OK | OK | OK | OK | OK | OK | OK | OK | OK | OK |
|  | NO. 8 | OK | OK | OK | OK | OK | OK | OK | OK | OK | OK |
|  | NO. 9 | OK | OK | OK | OK | OK | OK | OK | OK | OK | OK |
|  | NO. 10 | OK | OK | OK | OK | OK | OK | OK | OK | OK | OK |
| COMPARATIVE EXAMPLE | NO. 1 | OK | OK | OK | OK | OK | OK | OK | OK | OK | NG |
|  | NO. 2 | OK | OK | OK | OK | OK | OK | OK | NG | — | — |
|  | NO. 3 | OK | OK | OK | OK | NG | — | — | — | — | — |
|  | NO. 4 | OK | OK | OK | OK | OK | OK | NG | — | — | — |
|  | NO. 5 | OK | OK | OK | OK | OK | OK | NG | — | — | — |
|  | NO. 6 | OK | OK | OK | OK | OK | OK | OK | OK | OK | OK |
|  | NO. 7 | OK | OK | OK | OK | OK | OK | NG | — | — | — |
|  | NO. 8 | OK | OK | OK | OK | NG | — | — | — | — | — |
|  | NO. 9 | OK | OK | OK | OK | OK | OK | OK | OK | NG | — |
|  | NO. 10 | OK | OK | OK | OK | OK | OK | OK | OK | NG | — |

As can be seen from the table 1 indicating the experimental result, a problem does not arise in any of the ten HDDs in example 1 including the bag 42. On the other hand, in the comparative example not having the bag 42, a problem arose in two of the ten HDDs after 50 cycles lapsed. Nine of the ten HDDs could not withstand the experiment after 100 cycles lapsed.

In order to find the cause for the above problem in the comparative example, after the experiment, the surfaces of the heads of all the HDDs in the example 1 and the comparative example were checked. It could then be found that no adherend was detected on the surfaces of the heads of the HDDs in example 1, whereas adherends appearing to be organic matters having viscosity were detected on the heads of the HDDs of the comparative example. As a result of analyzing the adherends, it was found that they were organic silicone-based compounds.

From the above experimental result, it can be considered that in each of the HDDs in the above one set, even when the internal air pressure of the disk unit 20 changes due to a temperature change, the outside air does not enter the disk unit 20, and the disk unit 20 is thus kept clean, since each HDD is provided with the bag 42. Also, it can be considered that in each of the HDDs of the comparative example, the outside air enters the housing, thus contaminating the inside of the disk unit 20.

EXAMPLE 2

The following adsorptive sheet was prepared: a hole having a diameter of 35 mm was formed in a center portion of a rectangular activated charcoal sheet having a size of 50 mm×50 mm. In example 2, a cloth absorbent sheet (model:

a sheet in which kinds of binder fibers representative of kinds of Teflon-based fibers are mixed.

Furthermore, two polypropylene sheets having a thickness of 100 μm and a size of 60 mm×60 mm were prepared, which had a center portion in which a hole having a diameter 25 mm was formed. In one of the sheets, a communication hole 42a was formed close to a corner portion of said one of the sheets, and holes 42b and 42c for provision of an intake valve 46 and an exhaust valve 48 were formed close to a corner portion adjacent to the former corner portion. The holes 42b and 42c do not need to be provided separately; they may be formed continuous with each other. Alternatively, they may be formed in the other of the above sheets. In a portion of said one of the sheets, which surrounded the communication hole 42a, a seal member was provided, and the intake valve 46 and the exhaust valve 48 which had the above structure were provided at the holes 42b and 42c.

Then, the above adsorptive sheet and the two polypropylene sheets are stacked together such that the adsorptive sheet was interposed between the polypropylene sheets. The peripheral portions of the polypropylene sheets were welded together, and portions of the polypropylene sheets, which surrounded the holes, were also welded together, due to heat, to thereby form the bag 42. It should be noted that when the bag 42 was formed in the above manner, the sheets were stacked such that the intake valve 46 and the exhaust valve 48 and an annular seal portion provided in advance at the uppermost one of the above surrounding portions were located at outer peripheral surfaces of the bag 42. In the bag 42 formed in the above manner, an annular gas flow passage was formed in which the adsorptive sheets were sealed. Furthermore, the bag 42 and the disk unit 20 were stacked together such that the communication hole 42a of the bag 42 was coincident with the air intake and exhaust hole 2a, and the bag 42 was joined to the disk unit 20 by bonding the annular seal portion to the disk unit 20. Ten 2.5-inch drives each having a thickness of 9.5 mm were assembled in the above manner.

In the example 2, the HDDs are set as in the same manner as in the above one set in the example 1, and was subjected to the same experiment regarding the function as in the example 1. The result of the experiment is indicated in the following table 2:

TABLE 2

|  |  | NUMBER OF CYCLES | | | | | | | | | |
| --- | --- | --- | --- | --- | --- | --- | --- | --- | --- | --- | --- |
|  | NUMBER | 10 | 20 | 30 | 40 | 50 | 60 | 70 | 80 | 90 | 100 |
| EXAMPLE 2 | NO. 1 | OK | OK | OK | OK | OK | OK | OK | OK | OK | OK |
|  | NO. 2 | OK | OK | OK | OK | OK | OK | OK | OK | OK | OK |
|  | NO. 3 | OK | OK | OK | OK | OK | OK | OK | OK | OK | OK |
|  | NO. 4 | OK | OK | OK | OK | OK | OK | OK | OK | OK | OK |
|  | NO. 5 | OK | OK | OK | OK | OK | OK | OK | OK | OK | OK |
|  | NO. 6 | OK | OK | OK | OK | OK | OK | OK | OK | OK | OK |
|  | NO. 7 | OK | OK | OK | OK | OK | OK | OK | OK | OK | OK |
|  | NO. 8 | OK | OK | OK | OK | OK | OK | OK | OK | OK | OK |
|  | NO. 9 | OK | OK | OK | OK | OK | OK | OK | OK | OK | OK |
|  | NO. 10 | OK | OK | OK | OK | OK | OK | OK | OK | OK | OK |

As indicated in table 2, in the example 2, a problem did not arise in any of the ten HDDs. In this regard, the example 2 is the same as the example 1. That is, in the HDDs in the example 2 also, it can be considered that even when the internal air pressure changes of the disk unit 20 due to a temperature change, the outside air does not enter the disk unit 20, and the disk unit 20 is thus kept clean.

Moreover, in order to demonstrate the advantage of the adsorptive sheets containing the bag 42 sealed therein, the adsorption filters 18 provided in advance in all the HDDs in the examples 1 and 2 and the HDDs in the comparative example were removed from those HDDs, and the amounts of gas components adsorbed by the filters 18 were measured by a heating desorption gas analyzing method. The result of this measurement is indicated by the following table 3:

TABLE 3

|  | TOTAL AMOUNT OF GAS COMPONENTS | TOTAL AMOUNT OF SILOXANE-BASED COMPOUND |
| --- | --- | --- |
| EXAMPLE 1 | 0.2 μg/PER FILTER | 1.1 ng/PER FILTER |
| EXAMPLE 2 | 0.05 μg/PER FILTER | <0.2 ng/PER FILTER |
| COMPARATIVE EXAMPLE | 5.6 μg/PER FILTER | 520 ng/PER FILTER |

As is clear from table 3, the amount of a gas component adsorbed by each of the adsorption filters 18 removed from the HDDs in the example 2 is substantially the same as that of a new adsorption filter, and is extremely low, as compared with each of the adsorption filters 2 removed from the HDDs in the example 1. Therefore, it can be understood that when the adsorption filter is sealed in the bag 42, the disk unit 20 can be kept more clean.

The present invention is not limited to the above embodiment. When the invention is put to practical use, structural elements in the embodiment may be modified without departing from the subject matter of the present invention. Furthermore, various inventions can be made by appropriately combining structural elements in the embodiment. For example, of all the structural elements in the embodiment, some structural elements may be deleted, and/or structural elements may be appropriately combined.

For example, with respect to the above embodiment, the structure shown in FIG. 4 is explained as the structure of each of the intake valve 46 and the exhaust valve 48 provided at the bag 42 of the air intake and exhaust mechanism 40. The structure of each of the intake valve 46 and the exhaust valve 48 is not limited to that in FIG. 4. That is, any valve can be used as each of the intake valve 46 and the exhaust valve 48 as long as the threshold pressure at which it operates can be set.

What is claimed is:

1. A disk device comprising:
   a disk unit in which a disk-shaped medium is rotatably provided in a flat housing of the disk unit;
   a circuit board on which a driving circuit is mounted, and which is bonded to the disk unit; and
   a flat bag which is provided between the disk unit and the circuit board, includes a communication hole airtightly communicating with the housing, and has a volume which is changeable to compensate for changing of an internal air pressure of the housing.

2. The disk device according to claim 1, wherein the bag includes air intake and exhaust valves configured to take outside air in the bag and exhaust air therefrom to reduce a difference between an internal air pressure of the bag and an air pressure of the outside air when the difference exceeds a given value.

3. The disk device according to claim 2, wherein the communication hole and the air intake and exhaust valves are provided apart from each other.

4. The disk device according to claim 2, wherein the bag includes an elongated gas flow passage extending from the communication hole to the air intake and exhaust valves.

5. The disk device according to claim 1, wherein the bag is formed of material which is deformable in accordance with an irregular shape of the driving circuit.

6. The disk device according to claim 5, wherein the bag contains solid particles sealed therein, which prevent portions of the bag from adhering to each other.

7. The disk device according to claim 5, wherein the bag includes an inner surface subjected to embossing processing.

8. The disk device according to claim 5, wherein the bag is bonded to part of the circuit board which is located opposite to the communication hole.

9. The disk device according to claim 1, wherein the bag further includes an adsorptive sheet which is provided in the bag, and which is configured to adsorb gas therein.

10. The disk device according to claim 9, wherein the bag includes air intake and exhaust valves which are configured to take outside air in the bag and exhaust air therefrom to reduce a difference between an internal air pressure of the bag and an air pressure of the outside air when the difference exceeds a given value.

11. The disk device according to claim 10, wherein the communication hole and the air intake and exhaust valves are provided apart from each other.

12. The disk device according to claim 10, wherein the bag includes an elongated gas flow passage extending from the communication hole to the air intake and exhaust valves.

13. The disk device according to claim 9, wherein the bag and the adsorptive sheet are formed of material which is deformable in accordance with an irregular shape of the driving circuit.

14. A disk device comprising:
- a disk unit in which a disk-shaped medium is rotatably provided in a flat housing of the disk unit;
- a flat bag including a communication hole airtightly communicating with a housing of the disk unit, the flat bag having a volume which is changeable to compensate for changing of an internal air pressure of the housing; and
- air intake and exhaust valves configured to take outside air in the bag and exhaust air therefrom.

15. The disk device according to claim 14, wherein the air intake and exhaust valves operate to prevent the bag from being broken when a difference between an internal air pressure of the bag and an air pressure of the outside air exceeds a given value.

16. The disk device according to claim 14, which further comprises an adsorption sheet which is provided in the bag, and which is configured to adsorb gas therein.

17. The disk device according to claim 16, wherein the bag and the adsorption sheet are formed of material deformable in accordance with an irregular shape of the housing.

18. A disk device comprising:
- a disk unit in which a disk-shaped medium is rotatably provided in a flat housing of the disk unit;
- a circuit board on which a driving circuit is mounted, and which is bonded to the disk unit; and
- a flat bag provided between the disk unit and the circuit board, and configured to restrict transmission of heat, and absorb vibration and a sound,
- wherein the bag includes a communication hole airtightly communicating with the housing of the disk unit, and has a volume which is changeable to compensate for changing of an internal air pressure of the housing.

19. The disk device according to claim 18, wherein the bag includes the air intake and exhaust valves configured to take outside air in the bag and exhaust air therefrom to reduce a difference between an internal air pressure of the bag and an air pressure of outside air exceeds a given value.

20. The disk device according to claim 19, wherein the communication hole and the air intake and exhaust valves are provided apart from each other.

* * * * *